(12) United States Patent
Branca, Jr.

(10) Patent No.: US 9,242,503 B2
(45) Date of Patent: Jan. 26, 2016

(54) ELECTRONIC TRANSACTION CARD WITH STYLUS

(71) Applicant: MasterCard International Incorporated, Purchase, NY (US)

(72) Inventor: Frederick F. Branca, Jr., Patterson, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/289,695

(22) Filed: May 29, 2014

(65) Prior Publication Data
US 2014/0263664 A1    Sep. 18, 2014

Related U.S. Application Data

(63) Continuation-in-part of application No. 13/755,997, filed on Jan. 31, 2013, now Pat. No. 9,092,076.

(51) Int. Cl.
*B43K 23/00* (2006.01)
*G06K 19/077* (2006.01)
*B43K 31/00* (2006.01)

(52) U.S. Cl.
CPC ............ *B43K 23/001* (2013.01); *B43K 31/00* (2013.01); *G06K 19/0772* (2013.01); *G06K 19/07737* (2013.01)

(58) Field of Classification Search
CPC ............ G06F 2200/1632; G06F 3/03545; G06F 1/1679; B43K 23/001; B43K 31/00
See application file for complete search history.

(56) References Cited

U.S. PATENT DOCUMENTS

| | | | | |
|---|---|---|---|---|
| 2,708,903 A * | 5/1955 | Fehling | | 401/143 |
| 5,678,939 A | 10/1997 | Ross | | |
| 6,050,735 A * | 4/2000 | Hazzard | | 401/33 |
| 6,392,639 B1 | 5/2002 | Lee et al. | | |
| 7,296,944 B2 * | 11/2007 | Steinschaden | | 401/209 |
| 2010/0063893 A1 | 3/2010 | Townsend | | |

OTHER PUBLICATIONS

Carmody, "Neither Pen nor Pencil: Write Endlessly in Metal". Wired.com, Published Sep. 13, 2010. Accessed at <http://www.wired.com/2010/09/neither-pen-nor-pencil-write-endlessly-in-metal/>.*

* cited by examiner

*Primary Examiner* — Thien M Le
*Assistant Examiner* — Asifa Habib
(74) *Attorney, Agent, or Firm* — Leason Ellis LLP

(57) ABSTRACT

An electronic transaction card for completing a transaction is provided, the card includes an integrated stylus that can be used to sign paper receipts. In some embodiments the stylus is constructed to have a metal alloy tip that leaves an indelible mark when abraded on paper and does not require replacement or replenishing like an ink pen or pencil. In one embodiment a transaction card is provided that is substantially rectangular and at least one of the corners is shaped to define a mount that is configured to engage a stylus of the above construction for signing paper receipts. In another embodiment a transaction card is provided with a stylus for signing paper receipts having a stylus arm that is integrated into the base of the transaction card and a stylus tip of the above construction for signing paper receipts.

10 Claims, 7 Drawing Sheets

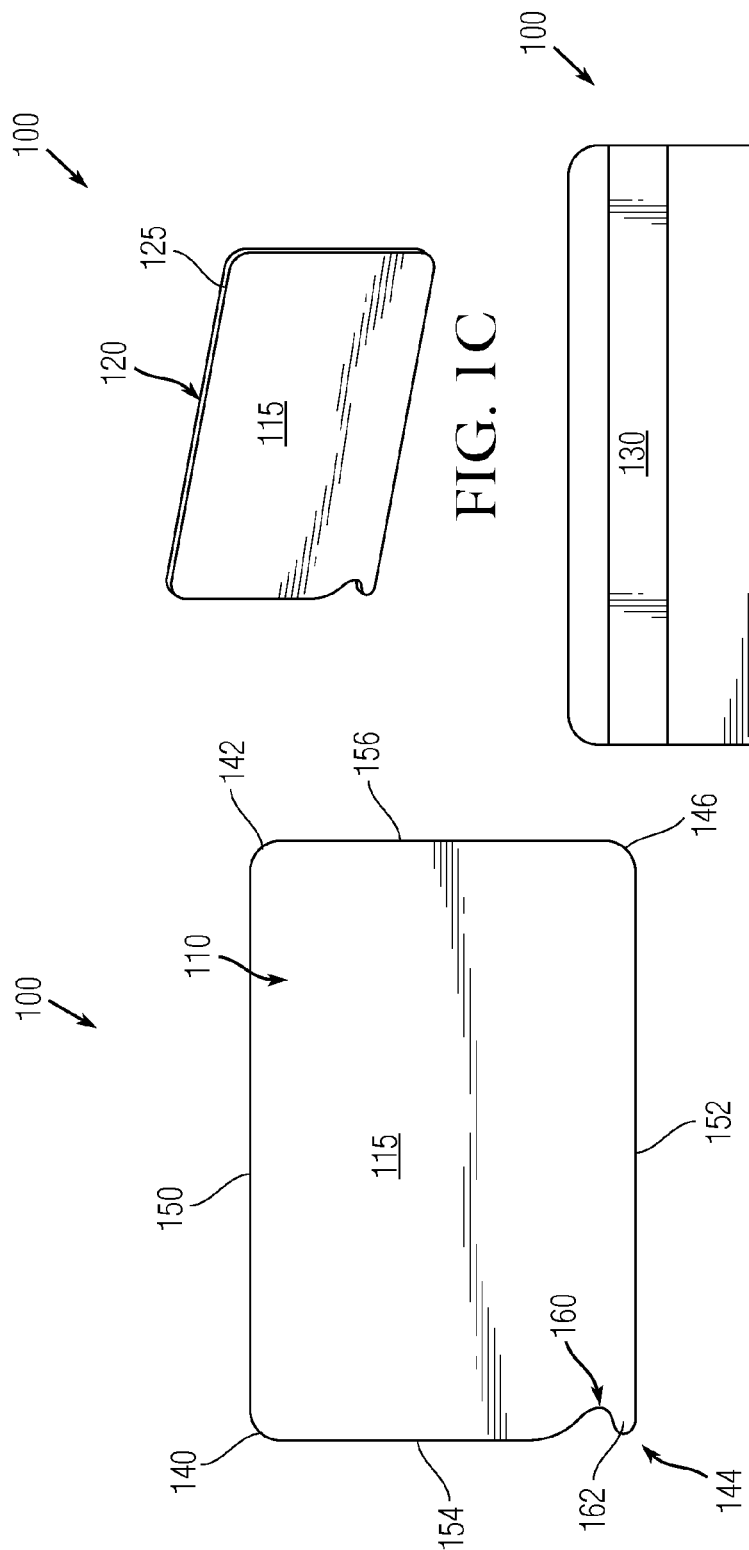
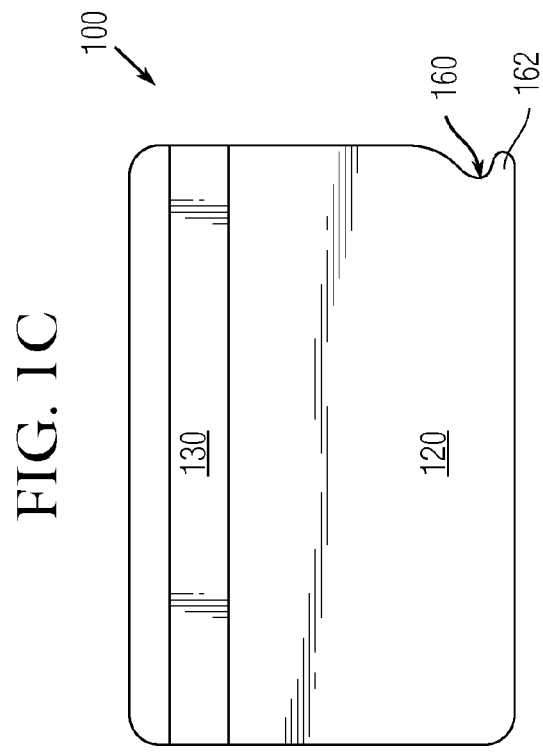
FIG. 1A
FIG. 1B
FIG. 1C

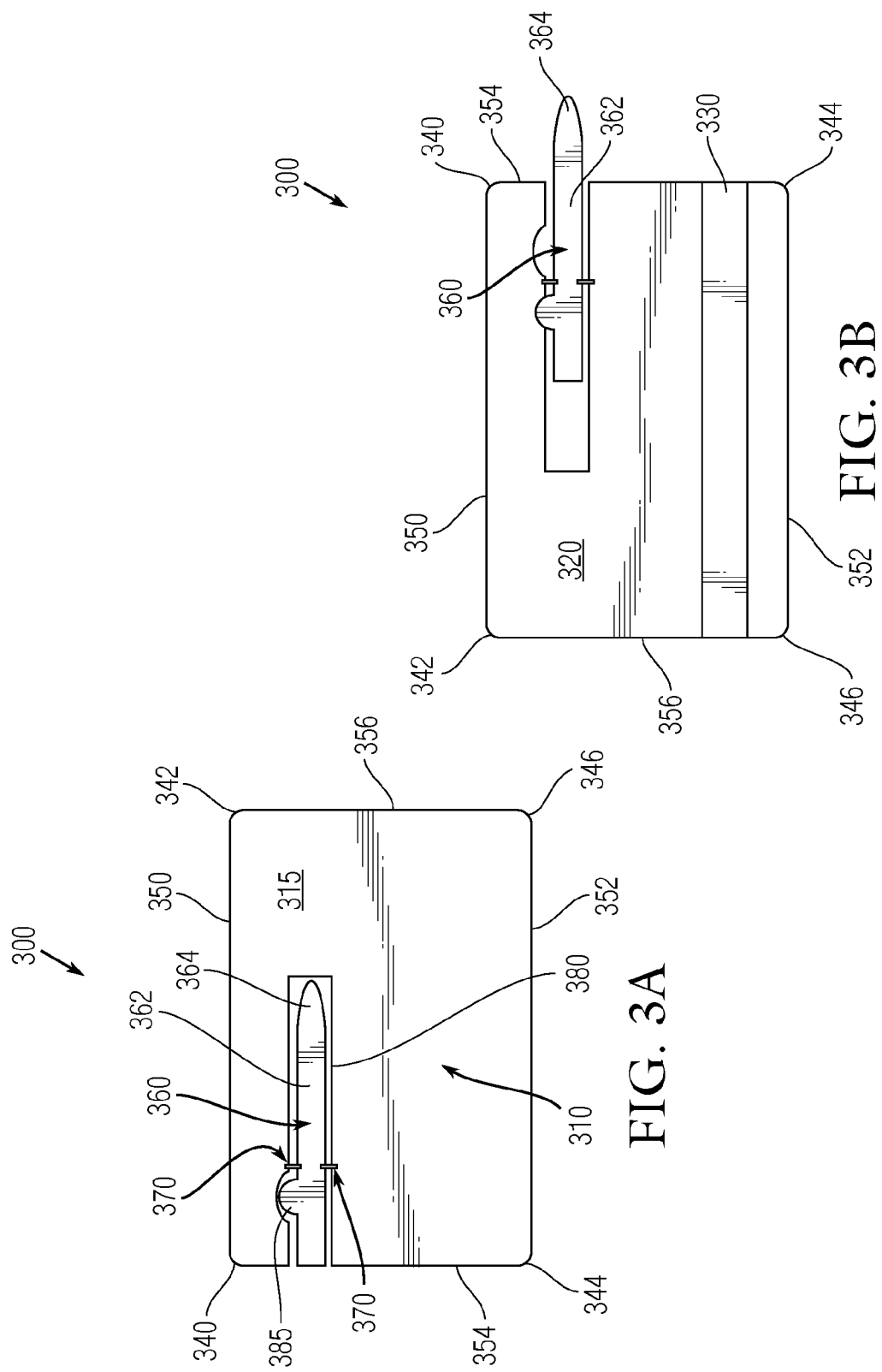

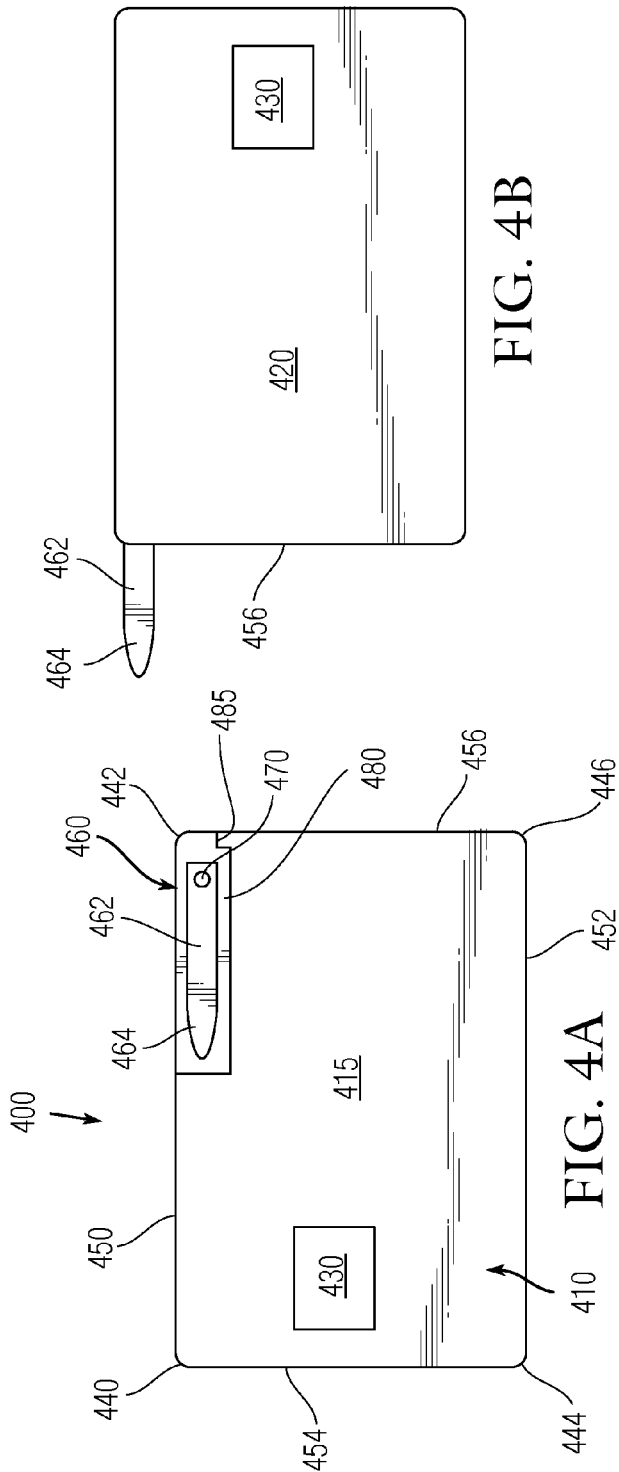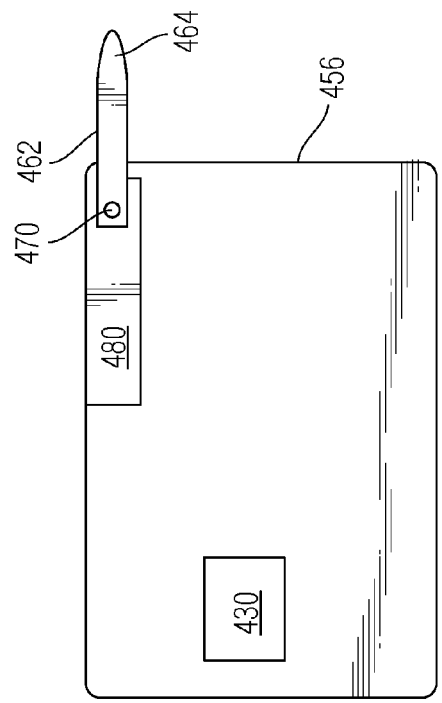
FIG. 4A
FIG. 4B
FIG. 4C

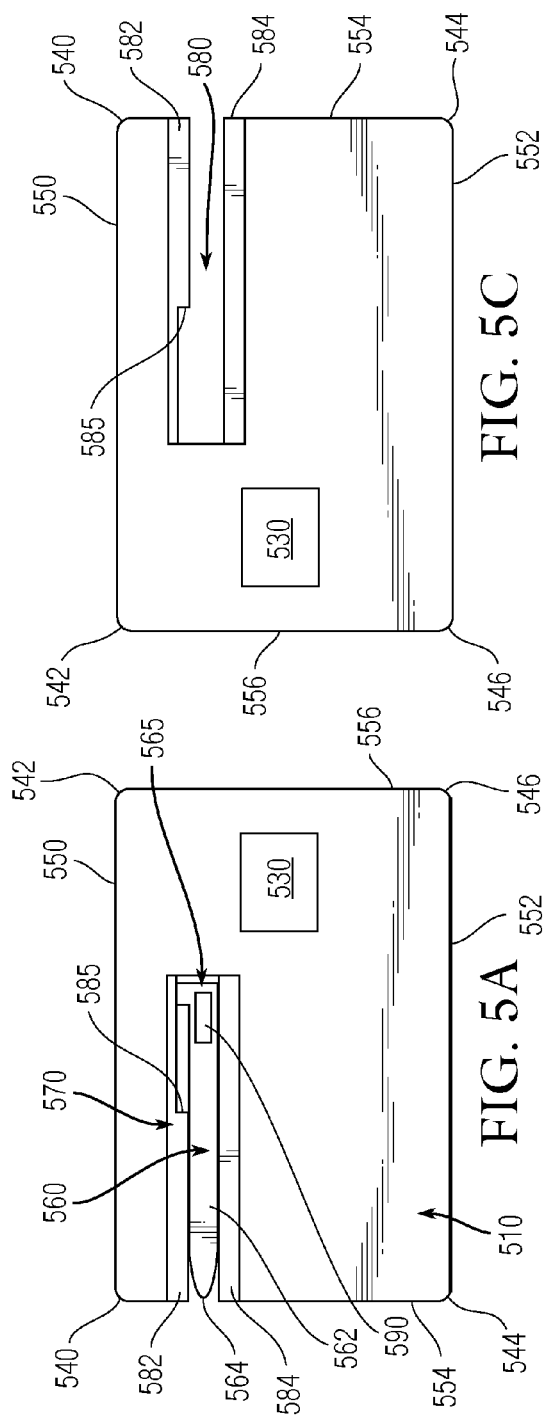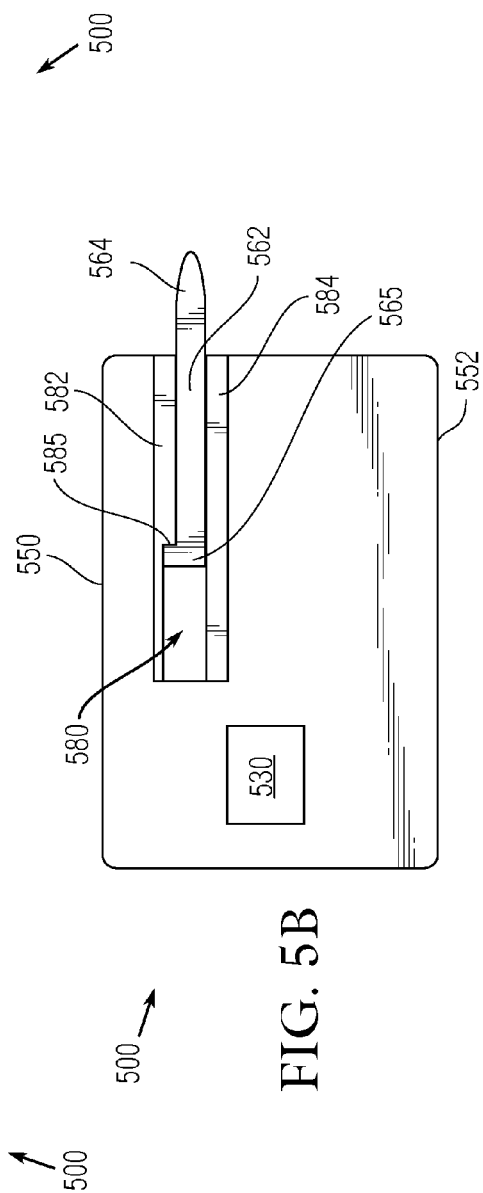

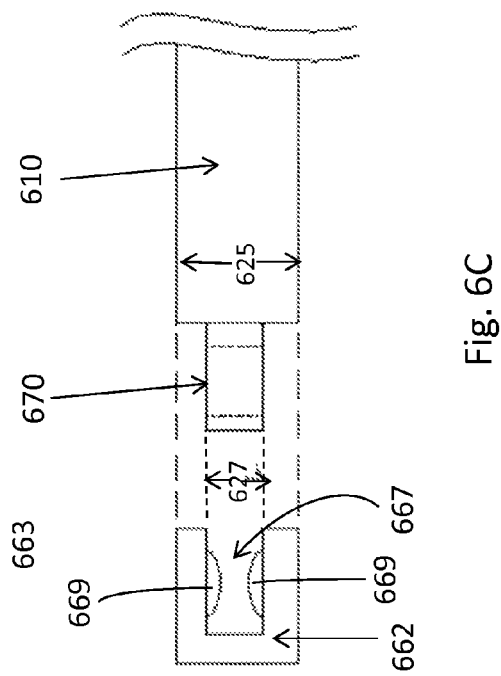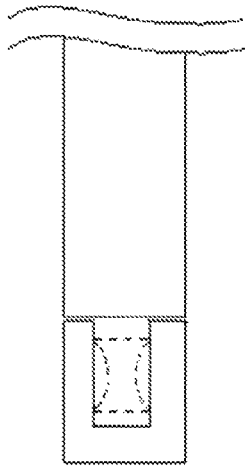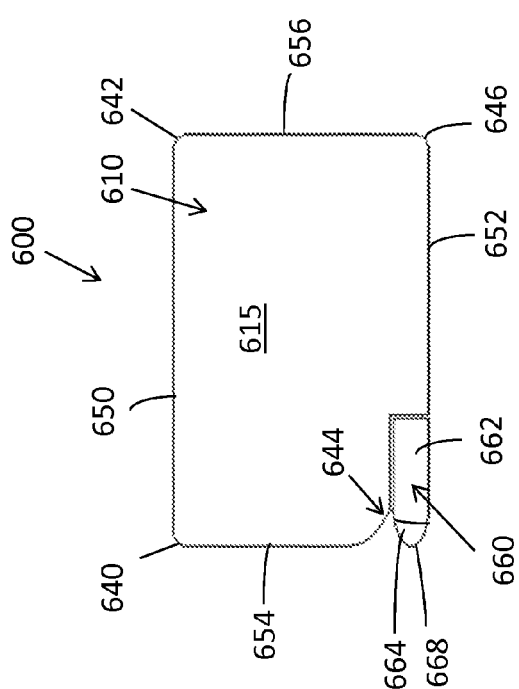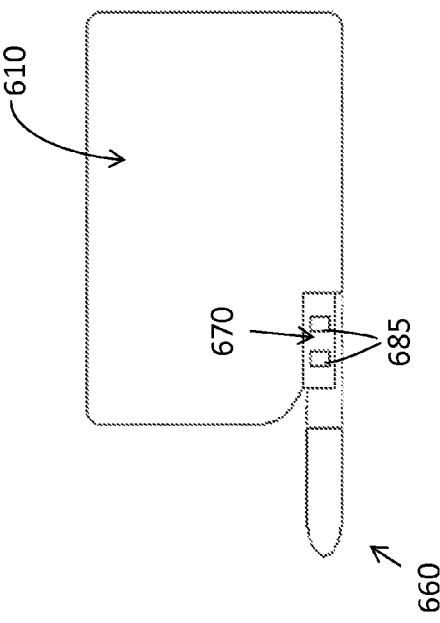

ELECTRONIC TRANSACTION CARD WITH STYLUS

CROSS-REFERENCE TO RELATED APPLICATIONS

This application is a continuation-in-part of U.S. patent application Ser. No. 13/755,997, filed Jan. 31, 2013, entitled "Electronic Transaction Card With Stylus," the entire contents of which is hereby incorporated by reference as if set forth in its entirety herein.

TECHNICAL FIELD OF THE DISCLOSURE

This disclosure relates to electronic transaction cards, and, in particular, to debit or credit card constructions.

BACKGROUND OF THE DISCLOSURE

Many individuals carry transaction cards such as credit cards, debit cards, pre-paid cards and the like to complete daily purchases. Generally, completing a credit card or pre-paid card transaction requires the user or merchant to swipe the user's transaction card and also requires the user to provide a signature for security purposes. While the signature portion of the transaction is traditionally completed using a pen on a printed receipt, more modern transaction processing systems implement electronic touchscreens and provide a stylus for a user to sign the touchscreen such that a digital copy of the signature is automatically saved to the transaction processing system. Similarly, completing a debit transaction often requires a user to input a pin number on a touch screen reader with a stylus. A stylus, in the context of this application, is a computer accessory that can assist a user in providing more precise interaction with a touchscreen than can be had by using a finger. As such, styli are generally shaped like writing utensils so that they can be grasped by a user. Furthermore, the tip of a stylus comes to a point, much like a pen or pencil, to provide precision interaction with the touchscreen. However, the tip of a stylus is rounded so as not to damage (e.g. scratch) the screen or inadvertently puncture a user's skin if mishandled. The tip of the stylus is generally made from a material such as plastic that has a low coefficient of friction so as to easily slide when in contact with the touchscreen. The touchscreen is configured to detect the interaction of the point of the stylus with the touchscreen.

Because the stylus of a transaction processing system is used by numerous individuals throughout the course of a day the stylus can become quite dirty, harbor bacteria and is generally unsanitary. While purchasing and carrying around a personal stylus is possible to avoid having to touch and use a "public" stylus of a transaction processing system, carrying yet another accessory is inconvenient. Although the corners of currently available credit and debit cards can be used to interact with a touch screen, they are not suitable for this application because the radius of curvature of a corner is too large to provide precise interaction with the touchscreen as required when providing a signature.

A further problem in the art is that even when the transaction is completed in the traditional manner using a pen on a printed receipt, the user is often required to use a "public" pen provided by the merchant which can be unsanitary. While purchasing and carrying around a personal pen is possible to avoid having to touch and use a "public" pen, carrying yet another accessory is inconvenient.

Therefore, it would be beneficial to have a credit/debit card with an integrated stylus that is specially adapted to be easily and effectively used in a sanitary manner when conducting transactions using an electronic touchscreen and/or signing printed receipts and does not require the user to carry any additional accessories.

These considerations are addressed by the present disclosure.

SUMMARY OF THE DISCLOSURE

The present disclosure concerns in a broad aspect a transaction card with an integrated stylus that can be used to sign paper receipts. The transaction card comprises: a base constructed from a substantially rectangular material having a front and back face defining a first thickness therebetween, and at least four corners. A stylus is disposed at a first corner, and at least a portion of the stylus is constructed from a metal alloy of the type which leaves an indelible mark when the metal alloy is abraded on a paper substrate. The transaction card also includes an electronic storage medium bearing information presentable to consummate a financial transaction.

According to another aspect, a transaction card with an integrated stylus is provided, the transaction card includes: a base constructed from a substantially rectangular material having a first and second face forming at least a first thickness. The base is shaped to define a mount that is configured to support a stylus. Also included is a stylus having a stylus arm. The stylus arm is configured to engage the mount and at least a portion of the stylus tip is constructed from a metal alloy of the type which leaves an indelible mark when the metal alloy is abraded on a paper substrate. The transaction also includes an electronic storage medium bearing information presentable to consummate a financial transaction;

These and other aspects, features, steps and advantages can be further appreciated from the accompanying figures and description of certain illustrative embodiments.

BRIEF DESCRIPTION OF THE DRAWINGS

FIG. 1A is a front plan view of a transaction card in accordance one embodiment;

FIG. 1B is a back plan view of a transaction card in accordance with the embodiment of FIG. 1A;

FIG. 1C is a perspective view of a transaction card in accordance with the embodiment of FIG. 1A;

FIG. 3A is a front plan view of a transaction card in accordance with a third embodiment;

FIG. 3B is a back plan view of a transaction card in accordance with the embodiment of FIG. 3A;

FIG. 4A is a front plan view of a transaction card in accordance a fourth embodiment showing the stylus in a retracted position;

FIG. 4B is a back plan view of a transaction card in accordance with the embodiment of FIG. 4A now showing the stylus in an extended position;

FIG. 4C is a front plan view of a transaction card in accordance with the embodiment of FIG. 4A also showing the stylus in the extended position;

FIG. 5A is a front plan view of a transaction card in accordance with a fifth embodiment;

FIG. 5B is a back plan view of a transaction card in accordance with the embodiment of FIG. 5A;

FIG. 5C is a back plan view of a transaction card in accordance with the embodiment of FIG. 5A;

FIG. 6A is a front plan view of a transaction card in accordance a sixth embodiment;

FIG. 6B is a front plan view of a transaction card in accordance with the embodiment of FIG. 6A;

FIG. 6C is a cross-sectional view of a transaction card in accordance with the embodiment of FIG. 6A;

FIG. 6D is a cross-sectional view of a transaction card in accordance with the embodiment of FIG. 6A.

DETAILED DESCRIPTION OF THE DRAWINGS

Figure 2:
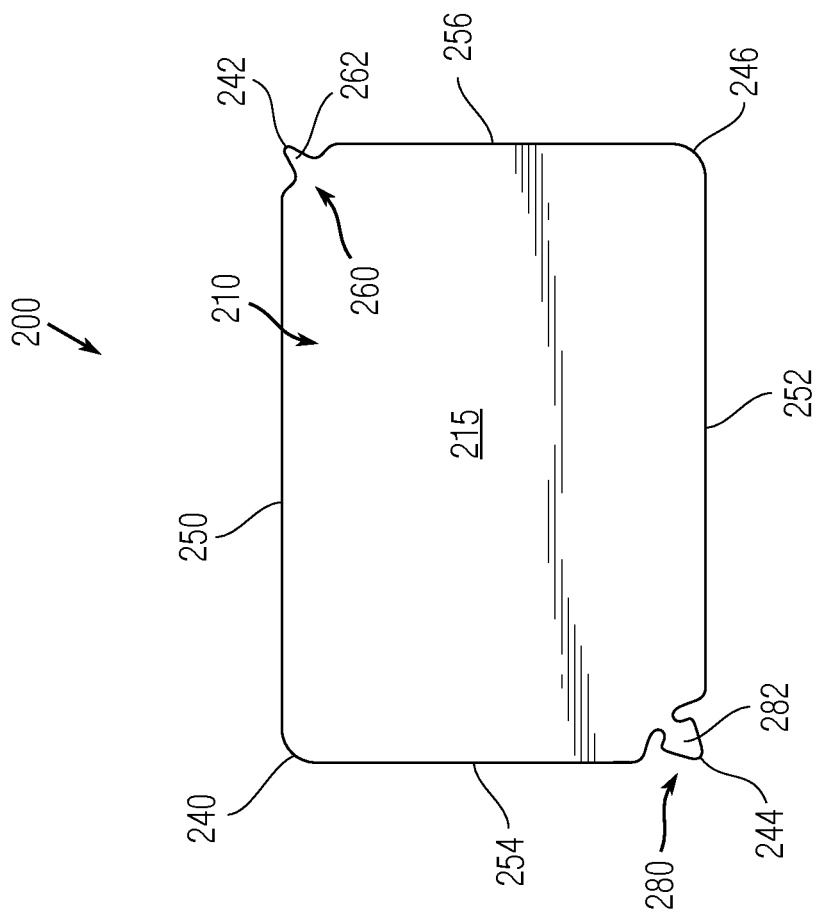
FIG. 2 is a front plan view of a transaction card in accordance with a second embodiment.

Illustrative embodiments of the disclosure will be described more fully hereinafter with reference to the accompanying drawings, in which some, but not all embodiments of the disclosure are shown. Indeed, the disclosure may be embodied in many different forms and should not be construed as being limited to the embodiments set forth herein; rather, these embodiments are provided so that this disclosure will satisfy applicable legal requirements. Like numbers refer to like elements throughout.

By way of overview and introduction, described herein is an electronic transaction card for completing an electronic transaction, such as a credit card or debit card or pre-paid card purchase, and for interacting with the touch screen of the transaction processing system in a sanitary manner. In general, a card is provided with an integrated stylus that can be used to sign or otherwise interact with a touchscreen of the type commonly found in electronic transaction processing systems. In one embodiment, a transaction card is provided that is substantially rectangular and at least one of the corners has a shape that defines a stylus tip that differs from at least one or more of the other corners of the card. In another embodiment a transaction card is provided with an extendible stylus. More particularly, the card includes a mount that supports a stylus that is movable between a stored position, in which the stylus tip does not protrude beyond the edges of the card, and an extended position, in which the stylus tip extends beyond the edge of the card. In accordance with a further aspect of the disclosure, a transaction card is provided with a stylus that can be used to sign paper receipts in a sanitary manner. Although the term stylus is used herein to describe various configurations of styli designed to be used to interact with a touch screen, stylus can also refer to a writing implement used to sign paper receipts in addition or alternatively to interacting with touch screens, as further described in relation to FIGS. 6A-6C.

FIGS. 1A-1C depict an electronic transaction card 100 according to an exemplary embodiment of the present disclosure. The card includes a base 110 constructed from a substantially rectangular material having a front face 115 and a back face 120. The thickness between the front face and the back face define a first thickness 125 of the card. The base includes at least four corners, a top left corner 140, a top right corner 142, a bottom left corner 144, and bottom right corner 146. The top left and top right corners are connected by a top side or edge 150. The bottom left and bottom right corner are connected by a bottom side 152. The top left and bottom left corners are connected by a left side or edge 154. The top right and bottom right corners are connected by a right side or edge 156. As depicted in FIG. 1B, also disposed on the face of the card is an electronic storage medium 130, which in this exemplary embodiment is a magnetic strip embedded in the back face of the card. Electronic storage mediums for use with electronic transaction cards are well known in the art, and include by way of example and not limitation, magnetic strips, onboard computer chips, NFC transponders, RFID transponders and the like. As depicted, the electronic storage medium is disposed lengthwise along the back of the card base material, towards the top side 150 and extends between the left side 154 and the right side 156.

The base or substrate can be formed from one or more of a variety of materials including but not limited to polymers such as polyvinyl chloride (PVC), metals, composites and the like, as is understood by persons of ordinary skill in the art.

In this exemplary embodiment, a bottom corner of the card is shaped to define a stylus 160. As discussed above, the exemplary transaction card includes a magnetic strip disposed on the back of the card towards the top side 150 and it is preferable for the stylus to be located on a corner that is opposite the magnetic strip (i.e. 144 or alternatively 146). However, it should be understood that the stylus can be defined on one or more of the corners that are closer to the magnetic strip.

The substrate is shaped near a bottom right corner to define a hook like on edge 154 that extends towards the bottom edge 152 and gradually extends inward from the line that generally defines the left side as shown in FIG. 1, and then transitions to extend back outwards towards the left side to define one edge of the stylus tip 162. The stylus tip extends towards the left side and is defined by a hook-like indentation. The width of the stylus tip converges to form an apex that points outward from the substrate, parallel to the bottom edge. The stylus tip is configured to point in this direction to be conducive to using the stylus to interact with a touch screen when a holding the card lengthwise along the bottom edge, similar to how a common writing instrument is held in a lengthwise fashion. The radius of curvature of the apex of the stylus tip is preferably between 0.25 mm and 3.0 mm, such that the stylus provides sufficient precision when interacting with a touchscreen, however, the radius of curvature is not limited to this range. The thickness of the stylus is consistent with the first thickness of the substrate, however, it should be understood that the thickness of the stylus tip can also converge to form a point, such that the point of the stylus tip is rounded in width and thickness. A rounded stylus tip allows the stylus tip to be moved across a touchscreen without abrading the touchscreen with a sharp edge.

The stylus can be formed from the same material as the card such as PVC, or an alternative material or combination of materials. For example, the stylus arm and the majority of the stylus tip can be made from plastic as is commonly used to make credit cards. In addition, the apex of the stylus tip can be made from a polymer material such as PTFE that has a low coefficient of friction and high self-lubricating characteristics as is understood by persons having ordinary skill in the art.

Although this exemplary embodiment discloses a single corner that is shaped to define a stylus, any number of the four corners can be shaped to define a stylus, either in the same hook shaped configuration as discussed above or in alternative configurations.

FIG. 2 depicts a front plan view of a transaction card 200 according to another exemplary embodiment of the present disclosure. The card includes a base or substrate 210 constructed from a substantially rectangular material having a front face 215 and a back face 220 (not shown). The front face and the back face define a first thickness of the card therebetween. The base includes at least four corners, a top left corner 240, a top right corner, 242, a bottom left corner 244 and bottom right corner 246. The top left and top right corners are connected by a top side or edge 250. The bottom left and bottom right corner are connected by a bottom side or edge 252. The top left and bottom left corners are connected by a left side or edge 254. The top right and bottom right corners are connected by a right side or edge 256. Also disposed in the base is an electronic storage medium 230, which in this exemplary embodiment is an RFID transmitter.

In this exemplary embodiment, the top side and right side are shaped to have complimentary indentations that define a parabola shaped stylus 260 near the intersection of the two sides. As the top side and right side converge, near their common corner, there is an inflection of each towards the interior of the base and then a reverse inflection transition to extend back outwards to define the stylus tip. The stylus tip extends outwards to the corner while the stylus tip converges to form an apex that points in the direction of the intersection of the lines generally defined by the top and the right sides. The stylus tip is configured to point in this direction as it is conducive to using the stylus to interact with a touch screen while holding the card in a variety of ways thereby accommodating many different writing instrument holding styles. The radius of curvature of the apex of the stylus tip is preferably between 0.25 mm and 3.0 mm, so that the stylus provides sufficient precision when interacting with a touchscreen, however, an apex with a smaller or larger radius can be envisioned. The thickness of the stylus is consistent with the first thickness of the base, however, it should be understood that the thickness of the stylus tip can also converge to form a point, such that the point of the stylus tip is rounded in width and thickness.

In addition, the exemplary card 200 depicted in FIG. 2 also includes a second stylus 280. The bottom side 252 and left side 254 are shaped to have complimentary indentations that define a spade shaped stylus 280 at or near the intersection of the two sides. As the bottom side extends towards the left side, the side has a rounded edge and sharply extends inward towards the interior of the base generally parallel to the left side. The side then has a rounded transition to extend back outwards towards the line generally defined by the majority of the length of the bottom side. The bottom side also gradually extends back towards the right side before transitioning again to extend towards the left side and define the stylus tip. The left side is formed to have a complementary indentation. The stylus tip extends outwards in the direction of the intersection of the lines generally defined by the bottom side and the left side and the width of the stylus tip converges to form an apex. The stylus tip is configured to point in this direction as it is conducive to using the stylus to interact with a touch screen while holding the card in a variety of ways thereby accommodating many different writing instrument holding styles. The radius of curvature of the apex of the stylus tip is preferably between 0.25 mm and 3.0 mm, so that the stylus provides sufficient precision when interacting with a touchscreen, however, an apex with a smaller or larger radius can be envisioned. The thickness of the stylus is consistent with the first thickness of the base, however, it should be understood that the thickness of the stylus tip can also converge to form a point, such that the point of the stylus tip is rounded in width and thickness.

FIGS. 3A-3B depict an electronic transaction card 300 according to yet another embodiment of the present disclosure. The card includes a base or substrate 310 constructed from a substantially rectangular material having a front face 315 and a back face 320. FIG. 3A is a front plan view of the card 300, showing the front face. FIG. 3B is a back plan view of the card 300, showing the back face. The front face and the back face define a first thickness of the card therebetween. The base includes at least four corners, a top left corner 340, a top right corner, 342, a bottom left corner 344 and bottom right corner 346. The top left and top right corners are connected along a top side or edge 350. The bottom left and bottom right corner are connected along a bottom side or edge 352. The top left and bottom left corners are connected along a left side or edge 354. The top right and bottom right corners are connected along a right side or edge 356. Also disposed in the base is an electronic storage medium 330, which in this exemplary embodiment is a magnetic strip located on the back face of the base.

The electronic transaction card also includes a stylus 360, having a stylus arm 362 and a stylus tip 364. In the exemplary embodiment, the stylus arm is generally rectangular and flat with the same thickness as the card so that the card can be stored in a wallet much like a traditional credit card free of bumps or irregularities in the surface that may be uncomfortable to a user or damage other items in the wallet. Alternatively, the stylus arm can be thicker or thinner than the base. Moreover, the stylus arm can be made in a variety of shapes including but not limited to a cylinder as would be understood by a person of ordinary skill in the art.

The stylus tip extends from the end of the stylus arm. In the exemplary embodiment, the thickness of the tip is consistent with the thickness of the stylus arm and base however, the width of the tip converges to form a point. The radius of curvature of the apex of the tip is preferably between 0.25 mm and 3.0 mm, so that the stylus tip provides sufficient precision when interacting with a touchscreen, however, a smaller or larger radius can be achieved. It should also be understood that the thickness of the stylus tip can also converge to form a point, such that the point of the stylus tip is rounded in width and in thickness.

The stylus can be formed from the same material as the card such as PVC, or an alternative material or combination of materials. For example, the stylus arm and the majority of the stylus tip can be made from plastic as is commonly used to make credit cards such as PVC. In addition, the point of the stylus tip can be made from a different polymer material such as PTFE that has a low coefficient of friction and high self-lubricating characteristics as would be well understood by a person of ordinary skill in the art.

The electronic transaction card also includes a mount. As depicted in FIGS. 3A-3B, the mount can comprise one or more pivots 370 that connect the stylus to the base. In this exemplary embodiment two pivot pins extend from the base into the sides of the stylus arm and rotatably secure the stylus to the base. The pivots are configured to support the stylus for movement between a first and a second position. FIG. 3A depicts a front plan view of the transaction card with the stylus in a first position. In this first position, the stylus is contained within the edge along the line defined by the top left corner and bottom left corner of the base (i.e., the left side 354). FIG. 3B depicts the back plan view of the card with the stylus in the second position. In the second position, the stylus tip and at least a portion of the stylus arm extend beyond left side 354.

In order for the stylus to be movable between the first position and the second position by rotating around the axis of the pivots, the base of the card is shaped to define a cut-out 380 that generally matches the shape of the stylus. In this exemplary embodiment, the cut-out extends from the left side 354 of the base towards the interior of the base, however, it should be understood that the cut-out can extend inward from any side of the base. Preferably, the stylus is mounted to the base within the cut out, such that it is generally flush with the front side and back side when in the first and/or second positions.

The electronic transaction card also includes a mechanical stop that prevents the stylus from moving beyond the second position. In the exemplary embodiment depicted in FIGS. 3A-3B, the mechanical stop is a protrusion 385 that extends from the stylus arm. The shape of the cut-out 380 corresponds to the profile of the stylus when in a first position, so that there is no interference between the protrusion and the base of the card. However, when the stylus is moved from the first position to the second position, as depicted in FIG. 3B, there is interference between the protrusion and the edge of the cut-out preventing the stylus from moving beyond the second position.

Although only one particular mechanical stop configuration is depicted in this exemplary embodiment, the stylus arm and the cut-out can take on a variety of shapes to create interference thereby preventing the stylus from extending beyond the second position, as would be well understood by a person of ordinary skill in the art. It should also be understood that the thickness of the protrusion can also be made smaller to make the stylus generally flush with the base of the card when in a second position. Similarly, the base can also include a depression, with a smaller thickness than the first thickness, where the protrusion contacts the base when in the second position so that the stylus is generally flush with the base of the card when in a second position.

FIGS. 4A-4C depict an electronic transaction card 400 according to yet another embodiment of the present disclosure. The card includes a base 410 constructed from a substantially rectangular material having a front face 415 and a back face 420. FIG. 3A is a front plan view of the card 400, showing the front face. FIG. 3B is a back plan view of the card 400, showing the back face. The front face and the back face define a first thickness 425 of the card therebetween and also a second thickness 427. The front face is formed to define a depressed region 480 that has a second thickness 427 which is less thick than the first thickness. The depressed region can be a result of a laminating process, a compression step, a milling process and so on. The base includes at least four corners, a top left corner 440, a top right corner, 442, a bottom left corner 444 and bottom right corner 446. The top left and top right corners are connected along a top side or edge 450. The bottom left and bottom right corner are connected along a bottom side or edge 452. The top left and bottom left corners are connected along a left side or edge 454. The top right and bottom right corners are connected along a right side or edge 456. Also disposed in the base is an electronic storage medium 430, which in this exemplary embodiment is an integrated circuit chip embedded within the base.

The electronic transaction card also includes a stylus 460, having a stylus arm 462 and a stylus tip 464. In this exemplary embodiment the stylus arm is rectangular and flat with a thickness that is less than the first thickness of the base. The stylus tip extends from the distal end of the stylus arm. In the exemplary embodiment, the thickness of the tip is consistent with the thickness of the stylus arm however, the width of the tip converges to form a point. The radius of curvature of the apex of the tip is preferably between 0.25 mm and 3.0 mm, so that the stylus tip provides sufficient precision when interacting with a touchscreen, however, a smaller or larger radius can be achieved. It should also be understood that the thickness of the stylus tip can also converge to form a point, such that the point of the stylus tip is rounded in three dimensions.

The stylus can be formed from the same material as the card such as PVC, or an alternative material or combination of materials. For example, the stylus arm and the majority of the stylus tip can be made from plastic as is commonly used to make credit cards. In addition, the point of the stylus tip can be made from a polymer material such as PTFE that has a low coefficient of friction and high self-lubricating characteristics as would be well understood by a person of ordinary skill in the art.

The electronic transaction card also includes a mount 470. As depicted in FIG. 4A, the mount can be one or more pivots that connect the stylus to the base. In this exemplary embodiment a single pivot extends from the base into the proximal end of the stylus arm and rotatably secures the stylus to the base. The pivot is configured to support the stylus in a first and a second position, and allow the stylus to be moved between the two positions. FIG. 4A depicts a front plan view of the transaction card with the stylus in a first position. In this first position, the stylus is contained within the perimeter edge defined along the line defined between the top right corner and bottom right corner of the base (i.e. right side 456). FIGS. 4B and 4C depict the card with the stylus in the second position. In the second position, the stylus tip and at least a portion of the stylus arm extend beyond right side 456.

In order for the stylus to be movable between the first position and the second position by rotating around the axis of the pivot, and to maintain an overall card thickness that is generally consistent, the base of the card is shaped to define a depression 480 that generally matches the shape of the stylus. As described above, the stylus arm is generally flat and has a smaller thickness than the first thickness of the card. Preferably, the thickness of the stylus and the second thickness of the base at the depression, together, approximately equal the first thickness. Accordingly, when the stylus is mounted to the base and in the first position, the front side has a generally even surface so that the card can be stored in a wallet without having any lumps or irregularities that may be uncomfortable to a user or damage other items in the wallet. Alternatively, the stylus arm can be thicker or thinner than the base. Moreover, the stylus arm can be made in a variety of shapes including but not limited to a cylinder, or a semi-cylinder as would be understood by a person of ordinary skill in the art. In this exemplary embodiment, the depression is located in the upper right corner of the base, however, it should be understood that the depression can be located at any corner the base.

The electronic transaction card also includes a mechanical stop 485 that prevents the stylus from moving beyond the second position. In the exemplary embodiment depicted in FIGS. 4A, 4C, the mechanical stop is an extension of the wall of the depression. The shape of the depression 480 corresponds to the profile of the stylus when in a first position, so that there is no interference between the protrusion and the base of the card. However, when the stylus is moved from the first position to the second position, as depicted in FIG. 4C, there is interference between the mechanical stop and the side of the stylus that prevents the stylus from moving beyond the second position.

Although only one particular shape of the stylus and depression and mechanical stop is depicted in this exemplary embodiment, the stylus arm and the depression and mechanical stop can take on a variety of shapes to prevent the stylus from extending beyond the second position, as would be well understood by a person of ordinary skill in the art.

FIGS. 5A-5C depict an electronic transaction card 500 according to yet another embodiment of the present disclosure. The card includes a base 510 constructed from a substantially rectangular material having a front face 515 and a back face 520. FIG. 5A is a front plan view of the card 500, showing the front face. FIG. 5B is a back plan view of the card 500, showing the back face. FIG. 5C is a back plan view of the card with the stylus removed. The front face and the back face define a first thickness of the card therebetween. The base includes at least four corners, a top left corner 540, a top right corner, 542, a bottom left corner 544 and bottom right corner 546. The top left and top right corners are connected along a top side or edge 550. The bottom left and bottom right corner are connected along a bottom side or edge 552. The top left and bottom left corners are connected along a left side or edge 554. The top right and bottom right corners are connected along a right side or edge 556. Also disposed in the base is an electronic storage medium 530, which in this exemplary embodiment is an embedded computer chip.

The electronic transaction card also includes a stylus 560, having a stylus arm 562 and a stylus tip 564. The stylus tip extends from the distal end of the stylus arm. In this exemplary embodiment, the stylus arm is L shaped and is flat with generally the same first thickness as the card so that the card can be stored in a wallet much like a traditional credit card without creating any lumps or irregularities that may be uncomfortable to a user or damage other cards in the wallet. However, alternatively, the stylus arm can be thicker or thinner than the base. Moreover, the stylus arm can be made in a variety of shapes including but not limited to a cylinder or semi-cylinder as would be understood by a person of ordinary skill in the art. In the exemplary embodiment, the thickness of stylus the tip is consistent with the thickness of the stylus arm and base however, the width of the tip converges to form a point. The radius of curvature of the apex of the tip is preferably between 0.25 mm and 3.0 mm, so that the stylus tip provides sufficient precision when interacting with a touchscreen, however, a smaller or larger radius can be achieved. It should also be understood that the thickness of the stylus tip can also converge to form a point, such that the point of the stylus tip is rounded in three dimensions.

The stylus can be formed from the same material as the card such as PVC, or an alternative material or combination of materials. For example, the stylus arm and the majority of the stylus tip can be made from plastic as is commonly used to make credit cards. In addition, the point of the stylus tip can be made from a polymer material such as PTFE that has a low coefficient of friction and high self-lubricating characteristics as would be well understood by a person of ordinary skill in the art.

The electronic transaction card also includes a mount 570 that connects the stylus to the base and is configured to support the stylus in a first and a second position, and allow the stylus to be moved between the two positions. FIG. 5A depicts a front plan view of the transaction card with the stylus in a first position. In this first position, the stylus is contained within the perimeter defined along the line between the top left corner and bottom left corner of the base (i.e. left side 554). FIG. 5B depicts the back plan view of the card with the stylus in the second position. In the second position, the stylus tip and at least a portion of the stylus arm, extend beyond left side 554.

Referring now to FIG. 5C, which is a back plan view of the card 500 with the stylus removed in order to more clearly depict the mount 570, in order for the stylus to be movable between the first position and the second position along the mount 570, the base of the card is shaped to define a cut out 580 that generally corresponds to the shape of the stylus. In this exemplary embodiment, the cut out extends from the left side 554 of the base towards the interior of the base, however, it should be understood that the cut out can extend inward from any side of the base. Preferably, the stylus is mounted within the cut out, such that it is flush with the front side and back side when in the first and/or second positions and is slide-able between the first and/or second positions.

The mount 570 includes an upper guide rail 582, and a lower guide rail 584, though in other arrangements a single guide rail can be provided. The guide rails are shaped to engage the sides of the stylus. In this exemplary embodiment the guide rails extend from the edges of the cut out and extend into the cut out and are rounded so that they are convex. The sides of the stylus can be concave to matingly engage the guide rails so that the stylus can slide along the guide rails between the first and second positions.

The electronic transaction card can also include a mechanical stop 585 that prevents the stylus from moving beyond the second position. In the exemplary embodiment depicted in FIGS. 5A-5C, the mechanical stop is a wall 585 of the guiderail. The shape of the cut-out 580, and the upper guide rail 582 create a wider empty space towards the interior of the card. Similarly, the stylus is L shaped with a wider proximal end 565. When in the first position, because of the corresponding shapes of the cut out, upper guide rail and stylus, there is no interference between the mechanical stop and the wider, proximal end of the stylus arm. However, when the stylus is moved from the first position to the second position, as depicted in FIG. 5B, there is interference between the wider proximal end of the stylus and the wall 585 of the guiderail preventing the stylus from moving beyond the second position.

Although only one particular mechanical stop configuration is depicted in this exemplary embodiment, the stylus arm and the cut-out can take on a variety of shapes to create interference thereby preventing the stylus from extending beyond the second position, as would be well understood by a person of ordinary skill in the art.

In addition, the surface of the stylus arm can include a grip area 590 that is configured to provide purchase to the user when sliding the stylus between the first and second positions. The grip can include but is not limited to a roughened surface, ribbing or a button like protrusion that a user can grip with a finger tip. While the grip area 590 is shown on the front surface of the stylus, it should be understood that one or more such grip areas can be provided on the front and/or back surface of the stylus.

Any of the foregoing embodiments can include one or more conductive materials to form at least a portion of the base, stylus arm and/or stylus tip thereby enabling the stylus to be used to interact with capacitive touch screen devices.

In accordance with a further aspect of the disclosure, a transaction card is provided with a stylus that is adapted for signing paper receipts in a sanitary manner. As noted above, a further problem in the art is that transactions conducted using an electronic transaction card are often completed by the user signing a paper receipt, as opposed to signing a touchscreen as discussed above. Traditional ink based writing instruments and lead based pencils are impractical for incorporation into a transaction card. Liquid ink is impractical as ink reservoirs can deplete, leak and would be impractically large for a transaction card designed to be stored in a wallet without creating sizeable lumps or irregularities that may be uncomfortable to a user or damage other cards in the wallet. Likewise, traditional pencils are also impractical for incorporation into a transaction card as the impression left by a pencil can be erased and pencil tips are prone to wear, breaking and require frequent replenishment.

FIGS. 6A-6C depict an electronic transaction card 600 according to yet another embodiment of the present disclosure. FIG. 6A is a front plan view of the card 600 having a base 610. The base 615 is constructed from a substantially rectangular material having a front face 615 and a back face (not shown) defining a generally uniform thickness. The base includes at least four corners, a top left corner 640, a top right corner, 642, a bottom left corner area 644 and bottom right corner 646. The top left and top right corners are connected along a top side or edge 650. The bottom left and bottom right corner are connected along a bottom side or edge 652. The top left and bottom left corners are connected along a left side or edge 654. The top right and bottom right corners are connected along a right side or edge 656. Also disposed in the base is an electronic storage medium 630 (not shown), for example, a magnetic stripe embedded within the base.

The electronic transaction card also includes a stylus 660 configured to be used for writing on printed receipts. The stylus 660 includes a stylus arm 662 and a stylus tip 664. As shown, the stylus arm is generally rectangular and has a thickness that is generally the same as the first thickness of the base. However, it should be understood that alternative configurations are possible, for example, the stylus arm can be thicker or thinner than the base and the stylus arm can take any number of shapes or variations/combinations of shapes, for example, a cylinder, a cone, cube, etc.

The stylus tip 664 extends from the distal end of the stylus arm. Preferably the dimensions of the stylus tip can taper in one or two directions to form a point 668 (the apex). In some implementations, the dimensions of the stylus tip can be generally consistent with the stylus arm where it extends from the arm, and the dimensions of the tip 664 converge to form the apex 668 that is preferably rounded in three dimensions. The radius of curvature of the apex of the tip is preferably between 0.25 mm and 3.0 mm, so that the stylus tip provides sufficient precision when being used to write, however, a smaller or larger radius can be achieved. In use, the tapered dimensions of the stylus tip allow forces applied to the transaction card and stylus arm to be transferred through the tip and be focused on the apex 668. As shown in FIG. 6A, the apex of the tip can be conical and having a radius of curvature in three dimensions. Alternative configurations are possible, for example, the thickness of the tip can be generally consistent with the thickness of the stylus arm however, the width of the tip converges to form the apex and at least the edge of the tip can be beveled or rounded. Accordingly, the rounded stylus tip allows the stylus tip to be moved across a piece of paper with less resistance than with a sharp edge and without abrading the paper with the sharp edge.

In accordance with a further aspect of the disclosure, at least a portion of the stylus tip 664 is specially constructed have a tip that does not require replacement or replenishing like an ink pen or wear like a traditional pencil and leaves a non-smudging and indelible mark on a variety of paper products including paper that is commonly used to print receipts. In some implementations, the stylus tip is constructed of a metal alloy that is used in inkless writing instruments as would be understood by those in the art. For example, the stylus tip can be constructed of a metal alloy that is specifically designed to transfer a small amount of the alloy and/or the oxidized alloy on the surface of paper when the tip is applied to the paper and dragged across the surface of the paper by the user with some force, thereby leaving an indelible mark. As one non-limiting example of a writing implement of conventional, cylindrical construction see The Beta Inkless pen (by Axel Weinbrecht Design of Germany).

The amount of alloy transferred with each stroke is small such that the stylus tip is expected to outlast the life of the card without needing to be refilled or replaced. By way of further example, the stylus tip can be constructed of a metal alloy tip that can cause the paper to oxidize when the tip is applied to the paper, thereby leaving an indelible mark with or without depositing the material forming the stylus tip on the paper. The stylus tip can be constructed entirely of such a metal alloy, or partially constructed using the metal alloy, for example, the stylus can be formed using one material and at least the surfaces of the stylus tip can be coated with the metal alloy.

The stylus arm can be formed from the same material stylus tip, for example, forming the stylus arm and stylus tip as a solid metal alloy. In addition or alternatively, at least a portion of the stylus arm can be constructed of the same material as the transaction card or combination of materials. For example, the stylus tip and the majority of the stylus arm can be made from a metal alloy and the remainder of the stylus arm can be made from plastic as is commonly used to make transaction cards. It can also be appreciated that the exemplary stylus tip can be made from the same material as the card and/or a polymer material such as PVC or PTFE as would be well understood by a person of ordinary skill in the art. Moreover, although the stylus arm, the stylus tip and the base are described as separate elements that are joined together, it can be appreciated that they are not necessarily distinct structural elements and any combination of the foregoing elements can be integrally formed.

FIG. 6B depicts a front plan view of the exemplary transaction card 600 with the stylus 660 separated from the base 610 in order to more clearly depict an exemplary configuration of a mount 670 for attaching the stylus to the base. In this exemplary embodiment, a cut out defining the mount 670 joins the left side 654 and bottom side 652 of the base. FIG. 6C, depicts a cross sectional view of the base 615 and the mount 670. As shown, the front face 615 and the back face 620 of the base can be formed to define the first thickness 625 of the base therebetween and define the second thickness 627 of the mount, which is less thick than the first thickness of the rest of the base. The shape and thickness of the mount can be a result of a laminating process, a compression step, a milling process and so on. Returning to FIG. 6B, the mount 670 can also be shaped to define one or more engaging features 685 for attaching the stylus to the base. In some implementations, the engaging features 685 can be through holes in the mount that are shaped to engage the stylus as further described herein, by way of further example, the engaging features can be depressions or indentations as would be understood by those in the art.

As shown in FIG. 6C, the top side 663 of the stylus arm 662 can include a concave trough 667 configured to engage the mount 670 thereby attaching the stylus 660 to the base 610. Preferably the trough 667 has a complimentary shape to the mount 670 such that the trough 667 can receive the mount 670 therein. In addition, the concave trough can include one or more locking features therein configured to interface with the engaging features 685 of the mount 670. In this exemplary implementation the locking features are protrusions 669. Preferably, the protrusions extend into the trough 667 and generally complement the shape of the engaging features 685 of the mount 670. The protrusions can have a rounded surface to present a smooth interface when the trough 667 is introduced over the mount 670. Preferably, the trough 667 has a width that is generally greater than the second thickness of the mount 670 and the distance between the protrusions 669 (or the protrusion and the opposite wall of the trough) is smaller than the second thickness of the mount. Accordingly, when the mount 670 is inserted into the trough 667, the mount 670 can exert a force causing the stylus arm to deflect. When the stylus arm is maneuvered into position such that the locking features 669 are in register with the engaging features 685, the elasticity of the stylus arm can cause the stylus arm to rebound to its natural position and, correspondingly, the protrusions and the engaging features matingly couple the stylus and the base as depicted in FIG. 6D.

Although only one particular mount and engaging feature configuration is depicted in this exemplary embodiment, a variety of configurations for the stylus arm and the mount can be used to join the stylus and the base such that the stylus and the base are matingly engaged and cannot be easily separated, as would be well understood by a person of ordinary skill in the art. For example, the mount can be shaped to define one or more protrusions and the stylus arm can include throughholes or indentations to matingly engage the protrusions. In addition or alternatively, the stylus can be fixedly attached to the base using, for example, glue or permanent fasteners as would be understood by those in the art. Alternatively, at least a portion of the stylus arm and/or the stylus tip can be fixedly attached to the base and/or integrally formed with the base, for example, by a lamination process, heat welding, molding, and the like.

It should be understood that, although this exemplary embodiment discloses a stylus included in the lower left corner of the base, the stylus can be similarly located at any corner the base, either in the exemplary configurations discussed above or in alternative configurations. Likewise, although only one particular shape of the stylus 660 and base 610 is depicted in this exemplary embodiment, the stylus arm 662, stylus tip 664 and the mount 670 can take on a variety of shapes and configurations to secure the stylus to the base, as would be well understood by a person of ordinary skill in the art.

Figure 7:
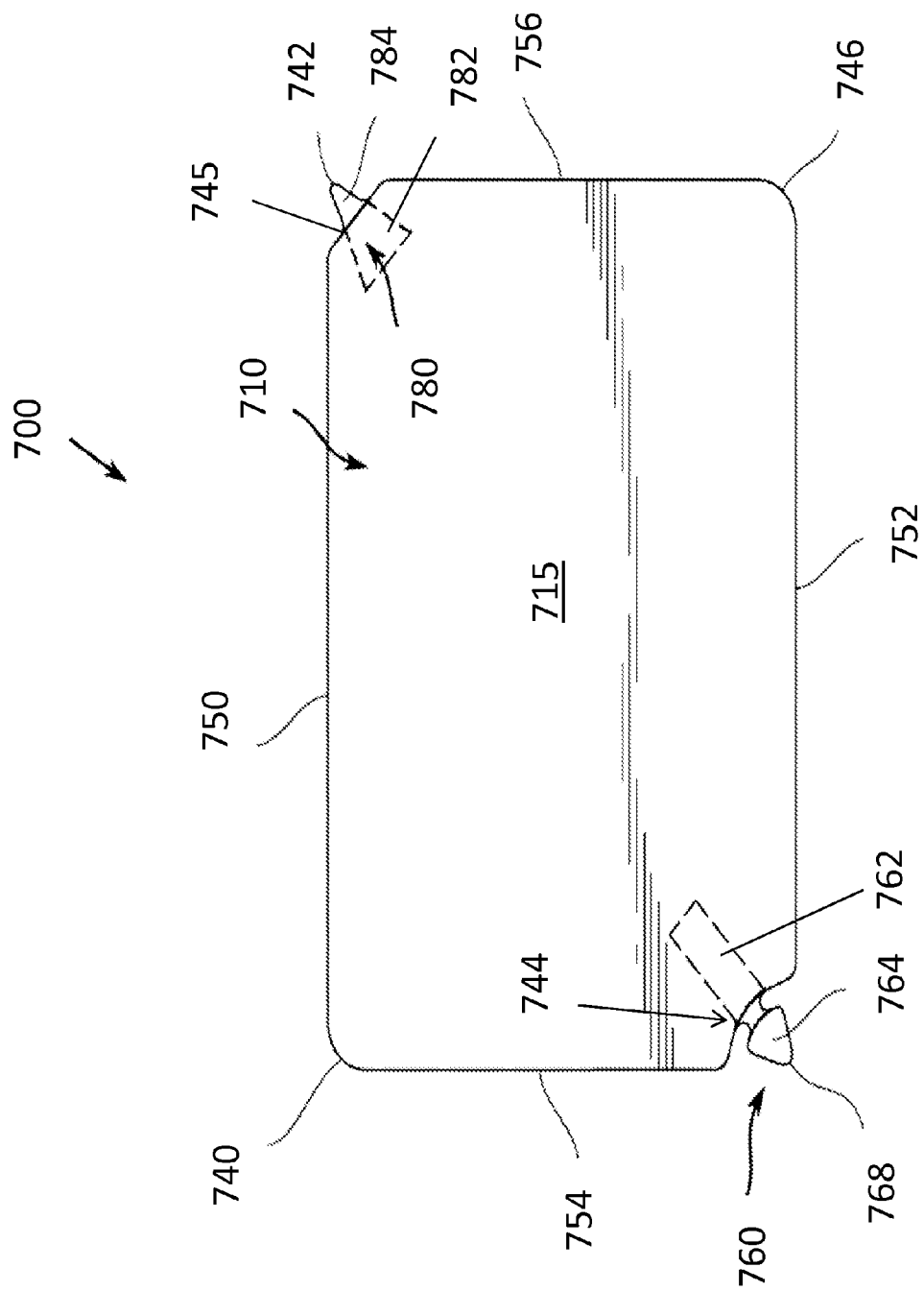
FIG. 7 is a front plan view of a transaction card in accordance a seventh embodiment.

By way of further example, FIG. 7 depicts a front plan view of a transaction card 700 according to another exemplary embodiment of the present disclosure. The card includes a base or substrate 710 constructed from a substantially rectangular material having a front face 715 and a back face (not shown). The front face and the back face define a first thickness of the card therebetween. The base includes a top side or edge 750, a bottom side or edge 752, a left side or edge 754 and a right side or edge 756. Also disposed in the base is an electronic storage medium (not shown). In this exemplary embodiment, the bottom side 752 and left side 754 are shaped to define a bottom left corner 744. In this example the bottom left corner is a concave bottom-left edge of the base 715, however, other configurations are envisioned.

A stylus 760 is also located in the bottom left corner area 744 of the base. The stylus includes a stylus arm 762 that is generally box shaped, having at least a proximal end embedded within the base 715 and a distal end that extends to at least the bottom left corner area 744 of the base. It can be appreciated that the stylus arm can be fixedly attached to the base and/or integrally formed with the base, for example, by a lamination process, heat welding, molding, and the like. A stylus tip 764 extends from the distal end of the stylus arm 762 outward from the bottom left corner 744 in the direction of the intersection of the lines generally defined by the bottom side 752 and the left side 754. The stylus tip 764 is configured to point in this direction as it is conducive to using the stylus as a writing implement while holding the card in a variety of ways thereby accommodating many different writing instrument holding styles.

In this exemplary implementation, the stylus tip is generally frustoconical in shape, having a diameter at its base (i.e., where it meets the stylus arm) that is greater than the thickness of the base. Preferably the dimensions of the stylus tip taper to form a point 768 (the apex) that is rounded in three dimensions so as to avoid defining a sharp point that can inadvertently puncture the user's skin, paper receipts or other objects. In some implementations, the radius of curvature of the apex of the tip is between 0.25 mm and 3.0 mm, such that the stylus tip provides sufficient precision when used to write, however, a smaller or larger radius can be achieved. In other implementations, the dimensions of the stylus tip, where it extends from the stylus arm, can be generally consistent with the stylus arm so as to form a stylus tip that does not increase the thickness of the card yet has a tip that is rounded so as to be conducive to writing as would be understood by those skilled in the art. In other implementations, the dimensions of the stylus arm or stylus tip can increase before converging to form the stylus tip.

In accordance with a further aspect of this embodiment of the disclosure, at least a portion of the stylus tip 664 is specially constructed have a tip that does not require replacement or replenishing, such as described above. Also he stylus arm can be formed from the same material stylus tip, for example, forming the stylus arm and stylus tip as a solid metal alloy. In addition or alternatively, at least a portion of the stylus arm can be constructed of the same material as the transaction card or combination of materials, as discussed above.

As a further example configuration of a stylus, the exemplary card 700 depicted in FIG. 2 also includes a second stylus 780. The top side 750 and right side 756 of the base 710 intersect at a convex top right corner 745 of the base. In this exemplary implementation, the second stylus 780 includes a stylus arm 782 that is at least partially embedded within the base 715. In addition, a stylus tip 784 extends outwards from the top right corner 745 and converges to form an apex 742 that is preferably rounded in three dimensions so as to form a suitable point for writing.

The exemplary stylus constructions disclosed herein can be included with any known card constructions. Thus, while there have been shown, described, and pointed out fundamental novel features of the disclosure as applied to several embodiments, it will be understood that various omissions, substitutions, and changes in the form and details of the devices illustrated, and in their operation, may be made by those skilled in the art without departing from the spirit and scope of the invention. Substitutions of elements from one described embodiment to another are also fully intended and contemplated. It is also to be understood that the drawings are not necessarily drawn to scale, but that they are merely conceptual in nature. The invention is defined solely with regard to the claims appended hereto, and equivalents of the recitations therein.

What is claimed is:

1. An electronic transaction card, comprising:
   a base constructed from a substantially rectangular material having a front and back face defining a first thickness therebetween, and at least four corners, wherein at least a first corner of the at least four corners has a shape which differs from the other corners;
   a stylus disposed at the first corner and extending away from the base to a stylus tip, wherein the shape of the base at the first corner defines at least a first portion of the stylus, and wherein a second portion of the stylus is constructed from a metal alloy of the type which leaves an indelible mark when the metal alloy is abraded on a paper substrate; and
   an electronic storage medium bearing information presentable to consummate a financial transaction.

2. The electronic transaction card of claim 1, wherein the stylus tip is rounded in at least two dimensions thereby defining an apex of the stylus tip.

3. The electronic transaction card of claim 2, wherein the stylus tip is rounded in at least three dimensions.

4. The electronic transaction card of claim 2, wherein the stylus includes a stylus arm, wherein the shape of the base at the first corner defines the stylus arm and at least a portion of the stylus tip such that the base, the stylus arm and the at least a portion of the stylus tip are integrally formed of the same material.

5. The electronic transaction card of claim 4, wherein the stylus tip includes the metal alloy, and wherein the metal alloy comprises a coating over a surface of the at least a portion of the stylus tip.

6. The electronic transaction card of claim 4, wherein the shape of the base at the first corner defining the stylus has a curvature that is one of: a parabola shape, a spade shape and a hook shape.

7. The electronic transaction card of claim 2, wherein the radius of curvature of the stylus tip is in the range of 0.5 mm to 1.0 mm.

8. The electronic transaction card of claim 2, wherein the stylus tip has a varying thickness which is greater than the first thickness at a base of the stylus tip and is less than the first thickness at the apex of the stylus tip.

9. The electronic transaction card of claim 2, wherein the stylus tip has a varying thickness which is equal to the first thickness at a base of the stylus tip and is less than the first thickness at the apex of the stylus tip.

10. The electronic transaction card of claim 2, wherein the stylus tip is generally cone shaped.

\* \* \* \* \*